United States Patent [19]

Hotchkiss

[11] 3,986,845
[45] Oct. 19, 1976

[54] FUEL COMPACTING APPARATUS
[76] Inventor: Arch Hotchkiss, 111 Bingham Road, San Marcos, Calif. 92069
[22] Filed: Mar. 13, 1974
[21] Appl. No.: 450,651

[52] U.S. Cl. .......................................... 44/13; 44/2; 100/94
[51] Int. Cl.² ........................ B30B 11/00; C10L 5/22
[58] Field of Search ............................ 44/2, 11–13; 241/223; 100/94

[56] References Cited
UNITED STATES PATENTS

| 2,833,633 | 5/1958 | Hecht | 44/13 |
| 3,706,540 | 12/1972 | Stanton | 44/2 |

Primary Examiner—Carl F. Dees
Attorney, Agent, or Firm—Paul B. Fihe

[57] ABSTRACT

Apparatus for compacting sheet or other burnable material into log-like form including means for severing the sheet into small chips, applying glue to the chips and then compactng the chips in a chamber dimensioned to form a log-shaped compacted unit.

16 Claims, 7 Drawing Figures

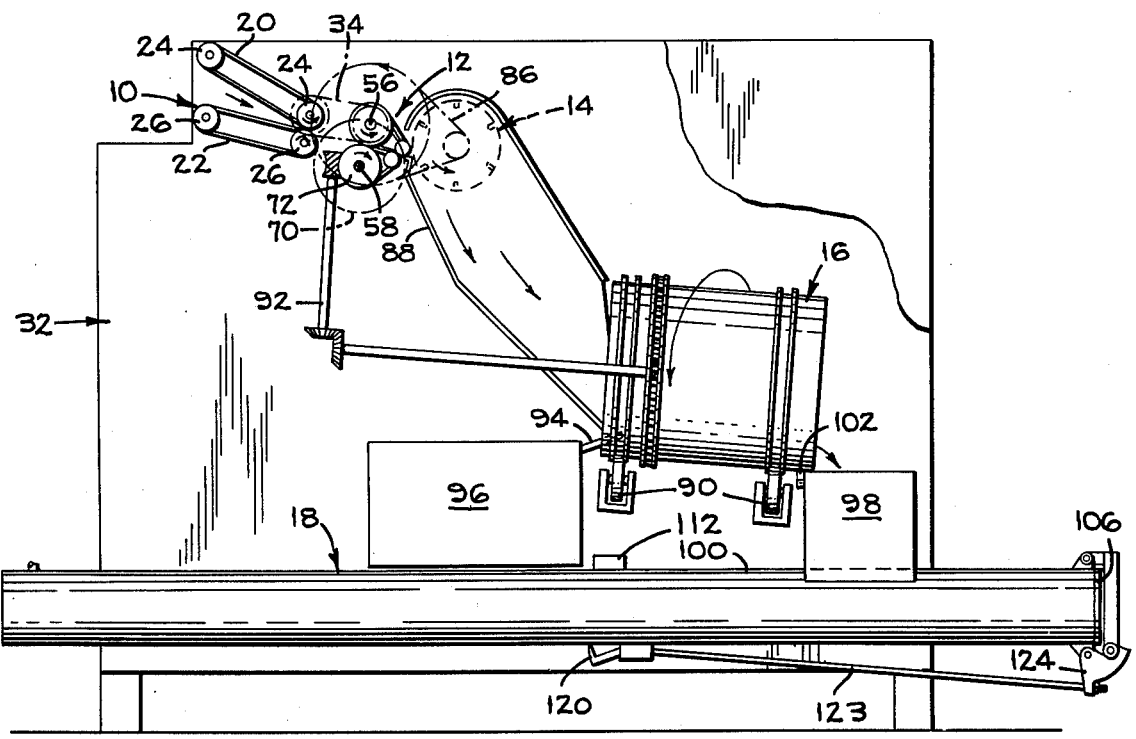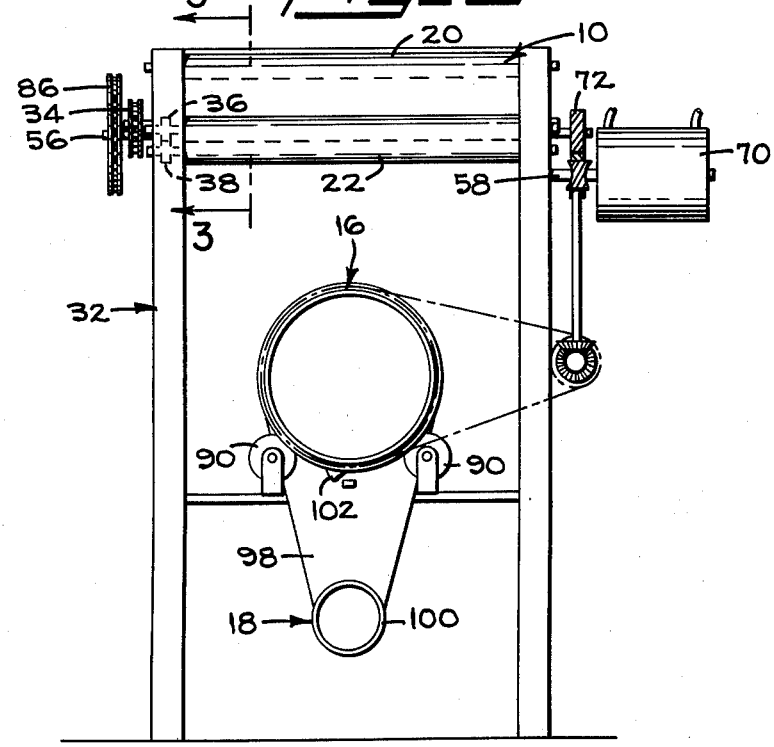

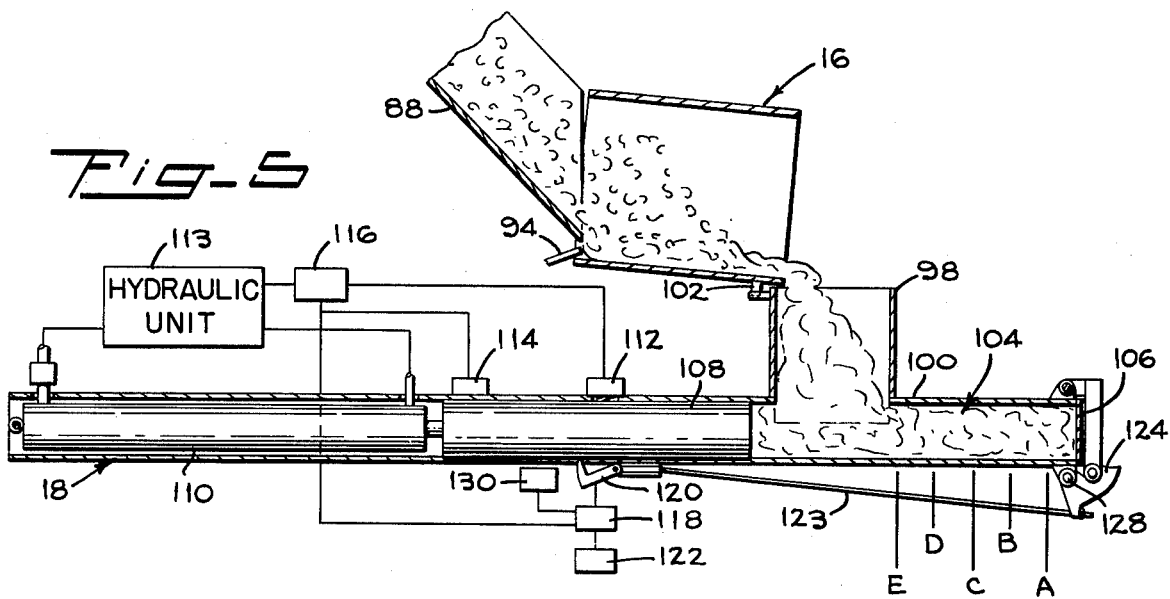
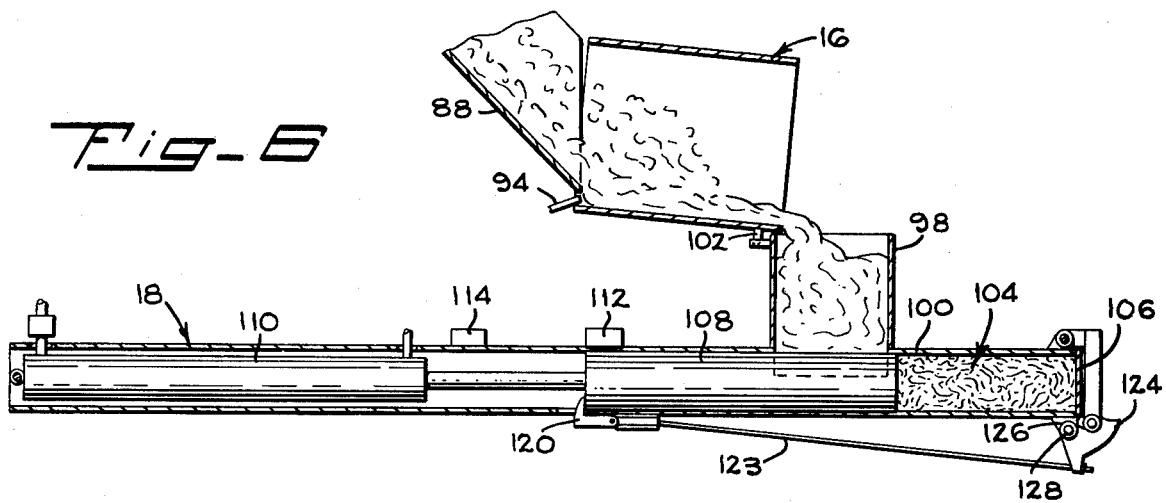
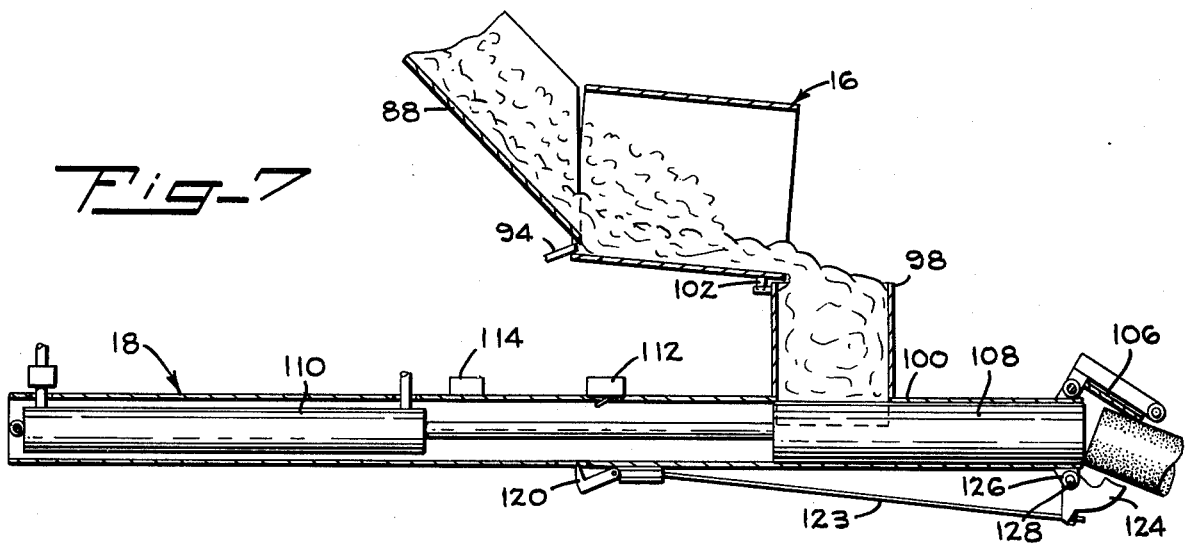

FUEL COMPACTING APPARATUS

FIELD OF THE INVENTION

The present invention relates generally to compacting apparatus and more particularly to apparatus for converting flammable material such as cardboard into compact burnable logs.

BACKGROUND OF THE INVENTION

While the disposal of solid waste materials has posed a general problem which continues to increase with the population density, the problem has become acute for grocery stores and other commercial establishments which handle a large volume of boxes and containers on a daily basis. For example, a typical supermarket unpacks and must dispose of two to five thousand cartons usually composed of cardboard material, each working day. Initially, the weight, which approximates 1 to 3 tons, presents some problem, but more significantly, the space or volume occupied by such quantities of lightweight material renders the handling and disposal extremely troublesome. Furthermore, while the cardboard material can be compacted with the conventionally employed mechanisms on present-day garbage or disposal trucks, cardboard material does have an elastic memory and when discharged at the dump, its volume remains large and must be left in this form in many dumping areas resultant from the restrictions on burning because of air pollution. It will be apparent that the handling and disposal of the waste materials in such supermarkets not only are troublesome and time-consuming but as a direct result provide a significant economic problem.

SUMMARY OF THE PRESENT INVENTION

Accordingly, it is the general objective of the present invention to provide a compacting apparatus which is arranged to convert cardboard, wood chips, or other material into a compact, log-like form, and particularly if the material be of a flammable nature such as cardboard, to produce an end product which can be sold and burned in a fireplace, thus providing conversion of the waste material into a useful end product.

If the raw material be in the form of cardboard cartons, the entrance end of the apparatus includes a pair of vertically-opposed convergent endless feed belts arranged to receive the cartons to gradually effect compression and collapse thereof into substantially flat sheets and to advance the sheets in succession to the next unit of the apparatus. Each sheet of material is then resiliently grasped between opposed pairs of a plurality of narrow endless belts that are resiliently supported on pulleys so as to effect a frictional engagement and advance of the sheet material into and through a plurality of associated opposed circular cutting knives which slice the material into a number of parallel rather narrow strips. In turn, the strips are then delivered to a transverse cutting mechanism by the same opposed narrow belts wherefore all the strips are severed at spaced intervals, thus reducing the cardboard or other material into a plurality of chips which are rather small and lightweight, typical transverse dimensions being ⅜ × ⅝ inch. The transverse cutter is preferably arranged to move downwardly in its cutting action so as to propel the lightweight chips both by mechanical contact and through a fan-type actuation through a downwardly directed discharge chute that empties into a rotating drum, which tumbles the chips and at the same time, because of a slight slope, effects a gradual forward motion of the chips through the drum. It will be apparent that if the raw material be in the form of small wood chips or the like, the initial cutting operations can be eliminated, and such chips be delivered directly into the rotating drum.

Adhesive material, preferably in the form of a water-soluble glue, is sprayed on the chips as they enter the drum so that an adhesive coating is applied thereto, the combination of the tumbling of the chips and the propelling impetus of the glue spray effecting substantially complete coverage of each chip. After the glue has cured, it constitutes a flammable material.

The coated chips emerging from the exit end of the rotating drum drop downwardly through a discharge tube into a compacting chamber preferably having a generally cylindrical cross-section, and periodically a hydraulic ram is actuated to move axially in the cylindrical chamber to compress the quantity of chips therewithin. Preferably, four or five repetitive compacting operations are done before the exit door to the chamber is opened whereupon the ram effects final ejection of the compacted cylindrical unit which accordingly has a log-like form so that it can be conveniently packed, sold and utilized, for example, by a householder as a burnable unit in a fireplace or the like. Alternatively, the compacted unit can be subsequently recycled in the manufacture of paper products.

BRIEF DESCRIPTION OF THE DRAWINGS

The stated objective of the invention and the manner in which it is achieved as summarized hereinabove will be more readily understood by a perusal of the following detailed description of the exemplary structure shown in the accompanying drawings wherein:

FIG. 1 is a diagrammatic side elevational view of a compacting apparatus for converting cardboard carbons into compacted cylindrical log-like units in accordance with the present invention, FIG. 2 is an elevational view of the entrance end of the apparatus as viewed from the left of FIG. 1, FIGS. 5, 6 and 7 are similar fragmentary, central, longitudinal, sectional views through a rotary drum and compacting mechanism forming the latter operational units of the apparatus, illustrating various operational positions.

DETAILED DESCRIPTION OF THE EXEMPLARY EMBODIMENT OF THE INVENTION

Figure 3:
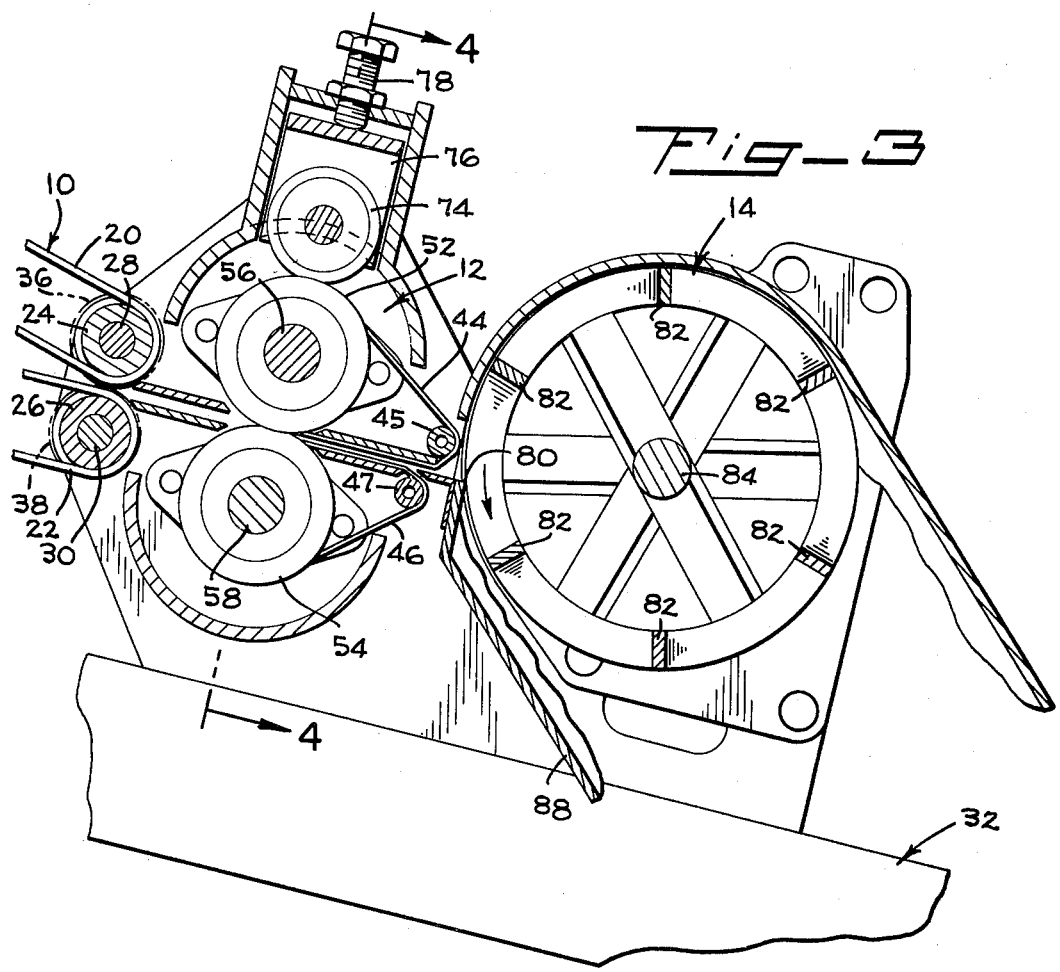
FIG. 3 is a fragmentary, enlarged, central, cross-sectional view through the cardboard severing mechanism, taken along line 3—3 of FIG. 2.

With initial general reference to FIG. 1, the illustrated compacting apparatus is arranged to receive emptied cardboard cartons and to ultimately produce as an end product burnable log-like units formed from compacted chips of the cardboard material. The cartons are manually placed in a feed mechanism 10 at the entrance end of the apparatus at the left of FIG. 1, which is arranged not only to advance the cartons but also to gradually compress and collapse the cartons into what amounts to a layered sheet of cardboard material, which is then fed to a slicing means 12 which severs the sheet material along parallel lines into a plurality of strips which are in turn delivered to a transverse cutting means 14 that severs the strips into a plurality of small chips of cardboard material that are passed through a rotary drum 16 wherein glue is applied, and are then discharged into a compaction mechanism 18 wherein the chips are tightly compacted into a log-like form for ultimate discharge as the finished end product.

More particularly, with additional reference to FIGS. 2 and 3, the carton feed mechanism 10 preferably takes the form of two vertically-opposed endless belts 20, 22, each of which is trained about rollers 24, 26 so that the adjacent flights of the upper and lower belts assume a convergent disposition. Transversely, the belts 20, 22 are sufficiently wide to accommodate a variety of carton sizes found in a particular installation, and similarly are spaced vertically at their entrance ends a sufficient distance so that the largest carton in a particular installation can be readily manually inserted between the belts to instigate the operation. The rollers 24, 26 are supported on shafts 28, 30 mounted in suitable bearings supported at opposite sides of a generally rectangular frame 32 and are driven by suitable sprocket chain connection 34 to a shaft 56 forming part of the adjacent slicing mechanism 12 to be described hereinafter, the shafts 28, 30 being interconnected by gears 36, 38 so that the adjacent flights of the belts advance in the same direction or to the right as viewed in FIG. 1, substantially at the same speed to effect the feeding and compression of the cartons.

Figure 4:
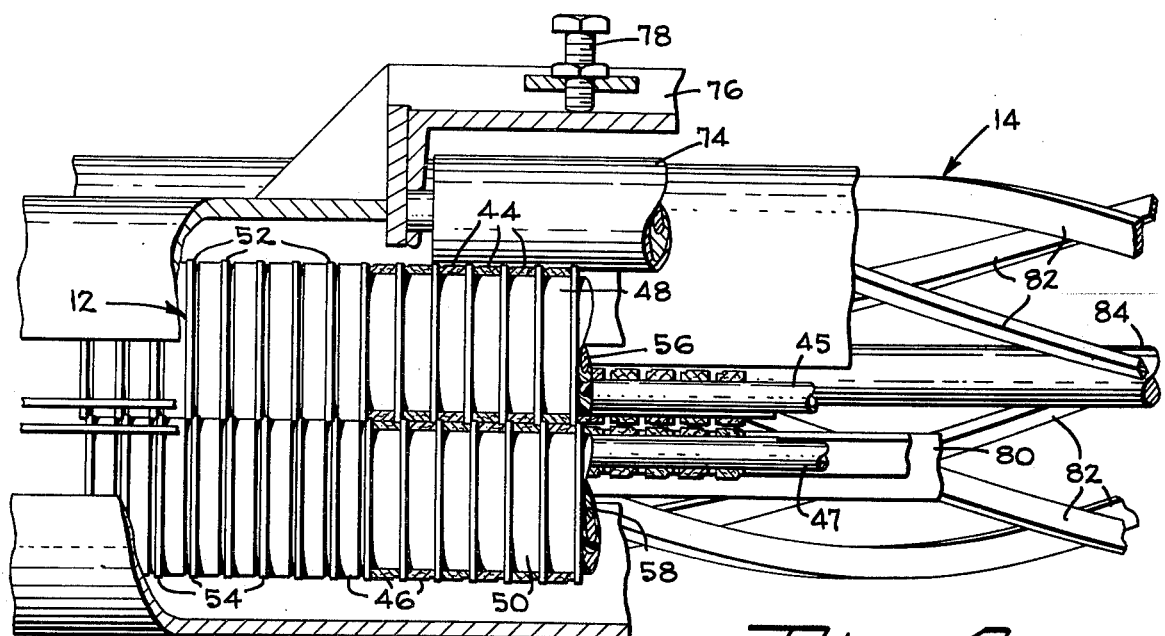
FIG. 4 is an enlarged vertical cross-sectional view taken along line 4—4 of FIG. 3.

As best shown in FIGS. 3 and 4, the cardboard sheet slicing means 12 incorporates a plurality of parallel endless belts 44, 46 trained about pulleys 48, 50 in vertically-opposed relationship so as to receive the sheet material from the feed belts 20, 22 and conduct the same through a plurality of circular slicing knives 52, 54 on the vertically-opposed pulley shafts 56, 58, preferably with a spacing of approximately ⅝ inch therebetween. Accordingly, the belts 44, 46 and associated pulleys 48, 50 each have this approximate lateral dimension to fill the space between the knives. As best shown in FIG. 4, the knives 52, 54 on the upper and lower shafts 56, 58 are laterally adjacent and radially overlap approximately ⅛ inch so that as the sheet material is passed therethrough, it is subjected to a slicing scissor-like action, thus to form a plurality of strips of the cardboard material approximately ⅝ inch in transverse dimensions. To assure that the cardboard material before and after it is sliced is effectively advanced, each pulley 48, 50 includes a central hub keyed to the shaft 56, 58 and an outer ring which the respective belt is supported and an intermediate annular resilient ring of rubber or similar material that will allow the outermost ring to give, depending upon the thickness of the cardboard immediately being contacted. Thus, even though the cardboard material is being cut by the knives, it can be engaged by the resiliently supported belts with sufficient frictional force to assure continued rapid advance of the cardboard, both before and after it has attained its strip form.

The two shafts 56, 58 for the circular knives, 52, 54 and intermediate pulleys 48, 50 are mounted at their ends in suitable bearings in side plates of the machine frame 32. A drive motor 70 is mounted at one end of the lower knife-pulley shaft 58 to effect rotation thereof preferably at a rate of approximately 50 RPM and similar rotation of the upper pulley-knife shaft 56 is achieved but in the opposite direction by a gear interconnection 72. Thus the adjacent flights of the narrow pulley belts 44, 46 move at precisely the same speed, in the same direction, to advance the cardboard.

Since it has been found that as a practical matter standard cartons require a transverse shaft dimension of approximately 2½ feet, considerable pressure is necessary to achieve the proper advance of the cardboard material. It is preferred as shown in FIG. 4 to mount a pressure roller 74 from a bracket 76 above the knives 52 on the upper shaft 56 and similarly below the knives 54 on the lower shaft 58 to retain the central portion of the shafts against deflection and ultimate failure, and an adjustment nut 78 can be turned to achieve the proper disposition of the upper and lower pressure rollers.

The parallel strips are continuously delivered by the opposed plurality of pulley belts 44, 46 over a fixed transverse blade 80 closely adjacent to which a transverse cutting blade 82 is arranged to pass downwardly. Preferably, the moving blade 82 has a generally helical configuration so that the strips are cut successively so that the total amount of force required for the cutting operation is reduced, and conveniently can be in the form of a plurality of blades mounted in the helical configuration from a central rotary shaft 84 supported in suitable bearings in the side of the machine frame so as to attain the general appearance of a standard lawn mower. A chain connection 86 drives the cutter shaft 84 and the sprockets are preferably designed so that its rotation is approximately 200 RPM. Since this cutter rotation is correlated with the advance of the sheet material through the slicer unit, the ⅝ inch strips of cardboard are cut into chips whose dimension in the direction of motion is approximately ⅝ inch. While the chips will fall by gravity through a sloping discharge chute 88, the downward motion of the cutting blades 82 effects a fanlike action which accelerates their downward motion and also directs downwardly any small particles of cardboard "dust" resultant from the longitudinal and transverse severing operations. Preferably the discharge chute 88 completely encompasses the transverse cutter so that no dust or chips can pass into the surrounding external environment.

The downwardly directed chips and any associated dust emerge from the chute 88 into the entrance end of the mentioned drum 16 supported for rotation on suitable rollers 90 mounted from the machine frame and driven preferably at a relatively slow rotation rate of approximately 6 RPM through a chain and worm drive connection 92 to the main drive shaft 58 of the slicer assembly 12 as can be best visualized by reference to FIG. 1. More particularly, the rollers 90 which support the drum are mounted so that the drum axis is displaced downwardly from its entrance to its exit end at an angle of approximately ten degrees. Thus, as the drum rotates, the chips will be tumbled therein and also will be gradually moved from the entrance to the exit end thereof.

A glue spraying nozzle 94 connected to a suitable source of liquid water-soluble glue 96 is centrally arranged in the lower entrance end of the drum 16 so as to direct its spray upwardly in a general conical configuration so as to intersect with the incoming chips and dust. Thus, the glue material is applied to the chips and because of the force of its spray also adds to the turbulent tumbling action of the chips so that substantially all surfaces have the liquid adhesive applied thereto prior to their exit from the rotary drum 16.

The chips which exit from the rotary drum 16 drop into a downwardly-convergent discharge chute 98 whose lower extremity drops the chips into an eight-inch opening in the top of an elongated cylindrical housing 100 which preferably has a diameter of approximately 4 inches. To avoid bridging and stoppage of flow of the chips downwardly through the chute 98, it preferably is flanged at its upper lateral edge and rests on frame members loosely so that the entire chute can be subjected to vibratory motion periodically in response to engagement by a cam 102 on the exterior of the rotary drum 16.

As best shown in FIGS. 5, 6 and 7, this cylindrical housing forms at one end a compaction chamber 104 for the chips delivered thereinto and includes a normally-closed pivoted door 106 at its exit extremity, as shown to the right in FIG. 5, and mounts a compaction ram 108 connected to a hydraulic cylinder 110 for repeated compressive application of force to the chips deposited from the chute 98. More particularly, upon the occasion of each eight-inch charge delivered to the compaction chamber 104, the ram 108 moves forwardly to compress that charge of chips against the exit door 106 into a compressed unit of 2 inches as indicated at the "A" position in FIG. 5. A normally-closed limit switch 112 projecting through an opening in the upper side of the housing at an intermediate position is connected in a standard hydraulic actuating circuit indicated at 113 and opens when it drops off the end of the ram after compression of the chips. The opening of this switch 112 in turn actuates the control circuit to reverse the flow of hydraulic fluid to the hydraulic cylinder 110 and thus effect retraction of the ram. After the ram has withdrawn from the chip entrance opening in the housing, another charge of chips is automatically deposited therein. When the ram fully retracts, an additional limit switch 114 is engaged to once again reverse the flow of hydraulic fluid so that the ram is once again extended to provide additional compaction of the second charge of chips, reaching the "B" position shown in FIG. 5.

Such action is repetitive, as indicated at the additional "C" and "D" positions in FIG. 5, until the plurality of chip charges is such that the ram 108, which is preferably supplied with hydraulic fluid at a pressure of approximately 1,000 p.s.i., does not move sufficiently forwardly to allow the limit switch 112 to drop from its surface, such operational position being the "E" position specifically shown in FIG. 6. The retention of the limit switch 112 in its closed position then switches the hydraulic source to a higher pressure of approximately 1,500 p.s.i. and a pressure switch 116 is actuated by this higher pressure to, after a predetermined time delay, reverse the travel of the ram and also instigate actuation of opening of the exit door 106.

More particularly, the pressure switch 116 actuates a solenoid 118 that raises a hook 120 into the path of the retracting ram 108 and after the hook is raised to the position shown in FIG. 6 an associated limit switch 122 is actuated to create a holding circuit for the solenoid 118 which retains the hook in its upper operative position as the ram retracts. The pivoted end of the hook 120 is connected through suitable pivoted linkage 123 to a latch 124 for the exit door 106 which is normally held in its latching disposition as shown in FIG. 6 by a torsion spring 126 on its pivot shaft 128, but the retraction of the ram 108 overcomes the spring action to urge the latch in a clockwise direction so that the door 106 can be opened. After the latch 124 has been opened, the extremity of the hook 120 engages another limit switch 130 which opens the circuit to the solenoid 118 so that the hook may drop downwardly and at the same time instigates forward motion of the hydraulic ram 108 at a relatively low pressure to effect ejection of the log through the unlatched exit door 106 as illustrated in FIG. 7. After complete ejection has occurred, the previously described limit switch 112 rides off the back of the ram 108 which reverses the ram motion to allow the exit door to swing by gravity into its closed position and then to allow action of the torsion spring to relatch it preparatory to a repeat operation.

It will be obvious that many modifications and/or alterations can be made in the structure as described without departing from the spirit of the invention and accordingly the foregoing description is to be considered as exemplary and not in a limiting sense and the actual scope of the invention is to be indicated only by reference to the appended claims.

What is claimed is:

1. Apparatus for compacting cardboard sheet material which comprises means for advancing the sheet material and for completely severing the same during such advance in two different directions to form chips of the material, a chamber disposed to receive the advancing material chips, and means for compacting the material chips in said chamber.

2. Compacting apparatus according to claim 1 wherein said advancing and severing means includes means for moving the sheet material along a predetermind path, a plurality of laterally adjacent and overlapping knives arranged to longitudinally slice the moving sheet to form a plurality of strips, and means for cutting said strips transversely during continued motion thereof to form the chips.

3. Compacting apparatus according to claim 2 wherein said sheet moving means includes a plurality of pairs of parallel endless belts above and below the predetermined path for engaging and frictionally advancing the material past said slicing knives to said transverse cutting means.

4. Compacting apparatus according to claim 3 wherein said sheet moving means includes a pair of resilient pulleys supporting each of said endless belts.

5. Compacting apparatus according to claim 3 wherein said slicing knives are circular knives supported for powered rotation between said parallel belts.

6. Compacting apparatus according to claim 5 wherein said circular knives constitute knife pairs supported above and below said material in overlapping adjacent relation between adjacent belts.

7. Compacting apparatus according to claim 2 wherein said transverse cutting means includes at least one helical blade supported for downward motion, adjacent the end of said material moving means.

8. Compacting apparatus according to claim 1 which comprises means for advancing and tumbling the chips toward said chamber, and means for spraying glue onto said advancing chips.

9. Compacting apparatus according to claim 1 wherein
said compacting means includes an elongated housing with said chamber formed adjacent one end threof, and
a hydraulic ram in said housing and operative to exert pressure against chips in said chamber to compact the same.

10. Compacting apparatus according to claim 9 which comprises
means for energizing said hydraulic ram repetitively until a compacted unit of chips of predetermined length is formed.

11. Compacting apparatus according to claim 10 which comprises
an exit door at the end of said housing, and
means automatically operative to open said door when said compacted unit is complete.

12. Apparatus for compacting cardboard cartons or the like which comprises
means for feeding and collapsing the cartons into flat substantially sheet form,
means for completely severing the sheets in two different directions to form material chips,
a chamber disposed to receive the chips, and
means for compacting the chips in said chamber.

13. Apparatus for severing cardboard sheet material which comprises
a plurality of pairs of parallel narrow endless belts supported in vertically-opposed relation to receive and frictionally advance the sheet material, and
a plurality of knife pairs supported for powered rotation in overlapping adjacent relation between said pairs of belts.

14. Apparatus for severing sheet material according to claim 13 wherein
said belts are supported for motion on resilient pulleys.

15. Apparatus for severing sheet material according to claim 13 which comprises
means for transversely cutting the sheet material advanced by said endless belts.

16. Compacting apparatus for small chips of cardboard material which comprises
an elongated housing having an entrance opening above a compacting chamber formed at one end thereof,
a hydraulic ram in said housing and operative to exert pressure against chips in said chamber,
means for energizing said hydraulic ram repetitively, and
means for successively delivering a plurality of groups of chips into said chamber until repetitive energization of such ram produces a compacted unit of predetermined length.

* * * * *